United States Patent
Hardy et al.

(10) Patent No.: US 7,404,425 B2
(45) Date of Patent: Jul. 29, 2008

(54) BELT PACKAGE FOR SUPER SINGLE TRUCK TIRES

(75) Inventors: Anthony Hardy, Colmar-Berg (LU); Jean-Michel Gillard, Arlon (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 427 days.

(21) Appl. No.: 11/050,061

(22) Filed: Feb. 3, 2005

(65) Prior Publication Data

US 2005/0126674 A1 Jun. 16, 2005

Related U.S. Application Data

(63) Continuation-in-part of application No. 10/411,510, filed on Apr. 10, 2003, now Pat. No. 6,868,882, which is a continuation-in-part of application No. 10/132,635, filed on Apr. 24, 2002, now Pat. No. 6,619,357.

(51) Int. Cl.
*B60C 9/22* (2006.01)
*B60C 9/20* (2006.01)

(52) U.S. Cl. .................. 152/527; 152/531; 152/533

(58) Field of Classification Search ............... 152/531, 152/533
See application file for complete search history.

(56) References Cited

U.S. PATENT DOCUMENTS

| | | | | |
|---|---|---|---|---|
| 3,557,858 A | * | 1/1971 | Lugli et al. | 152/531 X |
| 3,667,527 A | * | 6/1972 | Magistrini et al. | 152/531 X |
| 3,703,202 A | * | 11/1972 | Maiocchi | 152/531 X |
| 3,897,814 A | * | 8/1975 | Grawey | 152/531 X |
| 4,169,495 A | * | 10/1979 | Maiocchi | 152/531 X |
| 4,268,573 A | * | 5/1981 | Baillievier | 57/902 X |
| 4,293,019 A | * | 10/1981 | Maiocchi | 152/531 X |
| 4,934,430 A | * | 6/1990 | Koseki et al. | 152/531 X |
| 4,960,473 A | | 10/1990 | Kim et al. | |
| 5,054,532 A | * | 10/1991 | Kohno et al. | 152/531 X |
| 5,066,455 A | | 11/1991 | Kim et al. | |
| 5,383,507 A | * | 1/1995 | Sato et al. | 152/533 X |
| 5,562,792 A | * | 10/1996 | Caretta | 152/533 X |
| 5,878,564 A | | 3/1999 | De Vos et al. | |
| 5,902,425 A | * | 5/1999 | Armellin | 152/531 X |
| 5,975,175 A | * | 11/1999 | Armellin | 152/531 X |
| 6,065,518 A | * | 5/2000 | Miyawaki et al. | 152/531 X |
| 6,089,293 A | | 7/2000 | Niderost | |
| 6,315,019 B1 | * | 11/2001 | Garlaschelli et al. | 152/527 |
| 6,412,534 B1 | * | 7/2002 | Kohno et al. | 152/531 X |
| 6,619,357 B1 | | 9/2003 | Gillard et al. | |
| 6,868,882 B2 | | 3/2005 | Gillard et al. | |
| 2003/0010418 A1 | * | 1/2003 | Miyazaki et al. | 152/531 X |
| 2003/0201050 A1 | | 10/2003 | Gillard et al. | |

FOREIGN PATENT DOCUMENTS

EP 1 356 956 A2 10/2003

* cited by examiner

*Primary Examiner*—Adrienne C Johnstone
(74) *Attorney, Agent, or Firm*—Wood, Herron & Evans LLP

(57) ABSTRACT

A pneumatic tire with a belt ply helically wound on a carcass ply. The crown reinforcing structure of the tire includes a single helically wound belt ply reinforced with high elongation steel cords. A preferred steel cord construction for the reinforcing steel cords is 4×7 (four strands each including seven filaments) with individual 0.26 mm diameter, High Tensile carbon steel filaments.

15 Claims, 6 Drawing Sheets

BELT PACKAGE FOR SUPER SINGLE TRUCK TIRES

CROSS REFERENCE TO RELATED APPLICATIONS

This application is a continuation-in-part of application Ser. No. 10/411,510, filed Apr. 10, 2003, now U.S. Pat. No. 6,868,882, which is a continuation-in-part of application Ser. No. 10/132,635, filed Apr. 24, 2002, now U.S. Pat. No. 6,619,357, the disclosure of each of which is hereby incorporated by reference herein in its entirety.

FIELD OF THE INVENTION

The present invention relates to truck tires, preferably super single radial truck pneumatic drive tires.

Super single tires, which are wide base low aspect ratio truck tires replacing two small base tires, so-called dual mounted tires, have been used for years on trailers. Such tires are usually of size 385/65R22.5 or 385/55R22.5 and have a maximum load-carrying capacity of 4.5 metric tons.

Over the years these wide base tires appeared more and more on trucks in the steering position because they had a higher mileage.

Recently it became of interest to use also super single tires in the drive positions.

Tires in the drive position have to bear part of the trailer load and must have an increased load capacity. Tire standards define a load capacity of 5.8 metric tons and a maximum speed of 110 km/h. These tires have very low aspect ratios and are usually of size 495/45R22.5. Drive tires are exposed to harsh service conditions and conventional constructions show crown area durability problems. Furthermore the pressure distribution through the elastomeric blocks in the footprint lacks the required uniformity.

GB-A-1 567 614 discloses a pneumatic tire particularly suitable for heavy vehicles. Radially outwards of the belt layers there is at least one layer comprising metallic cords parallel to one another and substantially parallel to the circumferential direction. The metallic cords have an ultimate elongation between 4 and 8%. In a preferred embodiment, the layers of extensible metallic cord are formed by a single helically wound cord.

It is known from LU-A-85 964 to wind a ribbon reinforced with cords helically in at least two layers on top the belt plies of a passenger tire. The ribbon has a width comprised between 15 and 45 mm. The reinforcing cords are preferably of nylon and have a lateral density of about 30 ends per inch (EPI).

FR-A-2 285 255 discloses a crown reinforcing structure for pneumatic tires including a helically wound ribbon reinforced with steel cords. The ribbon has a width comprised between 5 and 50 mm and is directly wound on the carcass ply.

SUMMARY OF THE INVENTION

In accordance with an embodiment of the invention, a pneumatic tire comprises at least one pair of parallel annular beads, at least one carcass ply wrapped around said beads, a tread, first and second sidewalls disposed between said tread and one of said at least one pair of beads, and a crown reinforcing structure disposed between said at least one carcass ply and said tread in a crown area of said tire. The crown reinforcing structure includes a single helically wound belt ply reinforced with high elongation steel cords.

It is an object of the present invention to provide a super single radial truck tire having a crown reinforcement giving improved crown area durability.

A further object of the present invention is to provide a super single radial truck tire having a crown reinforcement resulting in an improved footprint shape and footprint pressure distribution.

Yet another object of the present invention is to provide a super single radial truck tire having excellent high speed properties and improved wear properties.

Still another aspect of the present invention is to provide a radial super single radial truck tire optimizing the trade-off between handling and durability.

Definitions

As used herein and in the claims,

"Aspect ratio" refers to the ratio of the tire's section height to its section width;

"Axial" and "axially" refer to directions which are parallel to the axis of rotation of a tire;

"Radial" and "radially" refer to directions that are perpendicular to the axis of rotation of a tire;

"Bead" refers to that part of a tire comprising an annular tensile member, the bead core, wrapped by ply cords and shaped, with or without other reinforcement elements to fit a designed tire rim;

"Belt" or "belt ply" refers to an annular layer or ply of parallel cords, woven or unwoven, underlying the tread, not anchored to the bead, and having cord angles of from 0° to 80° with respect to the EP of the tire;

"Carcass" refers to the tire structure apart from the belt structure, tread, undertread, and sidewall rubber but including the beads, (carcass plies are wrapped around the beads);

"Circumferential" refers to lines or directions extending along the perimeter of the surface of the annular tread perpendicular to the axial direction;

"Cord" refers to one or more of the reinforcement elements, comprising one or more filaments/wires which may or may not be twisted or otherwise formed, which may further include strands which strands may also be formed, of which the plies in a product are comprised;

"Crown" refers to substantially the outer circumference of a tire where the tread is disposed;

"Equatorial plane (EP)" refers to a plane that is perpendicular to the axis of rotation of a tire and passes through the center of the tire's tread;

"Filament" refers to an individual metallic wire;

"Footprint" refers to the contact patch or area of contact of the tire tread with a flat surface at zero speed and under normal load and pressure or under specified load, pressure and speed conditions;

"High elongation (HE) steel cord" refers to a Lang's lay cord in which the strands are loosely associated and movable relative to each other, to allow the cord to be stretched substantially at a given load;

"High Tensile Steel (HT)" refers to a carbon steel with a tensile strength of at least 3400 MPa @ 0.20 mm filament diameter;

"Lay length" refers to the axial distance required for a filament, strand or layer to make one 360-degree helical revolution in a strand or cord;

"Lang's Lay Cord" refers to a cord in which the direction of lay in the strands is the same as the direction of lay in closing the cord.

"Normal Tensile Strength (NT) Steel" refers to a carbon steel with a tensile strength of at least 2800 MPa @ 0.20 mm filament diameter;

"Ply" refers to a continuous layer of rubber coated parallel cords;

"Section height" refers to the radial distance from the nominal rim diameter to the outer diameter of the tire at its equatorial plane;

"Section width" refers to the maximum linear distance parallel to the axis of the tire and between the exterior of its sidewalls when and after it has been inflated at normal inflation pressure for 24 hours, but unloaded, excluding elevations of the sidewalls due to labeling, decoration or protective bands;

"Spliced belt ply" refers to a ply that has the lateral sides extending across the whole lateral width of the belt, the circumferential ends being spliced and overlapping, forming a lap-splice or a butt-splice;

"Strand" refers to a group of filaments combined together to form a unit;

"Super single tire" refers to a tire which replaces dual mounted tires on a specific axle; they are low aspect ratio tires and have a section width exceeding the section width of one of the previously dual mounted tires but inferior to the dual assembly width;

"Super Tensile Steel (ST)" refers to a carbon steel with a tensile strength of at least 3650 MPa @ 0.20 mm filament diameter;

"Tensile strength" is determined by ASTM A370-92 as applied to steel wire product;

"Tread width (TW)" refers to the arc length of the tread surface in the axial direction, that is, in a plane passing through the axis of rotation of the tire; and "Twist" refers to the number of turns about its axis per unit of length in a filament, strand or cord.

"Twist direction" refers to the slope of the helix of a filament, strand or layer when the cord is held vertically and may be left or right. If the slope of the spirals conforms in direction to the slope of the center portion of the letter "S", then the twist is called "S" or "left-hand". If the slope of the spirals conforms to the slope of the center portion of the letter "Z", then the twist is called "Z" or "right-hand".

BRIEF DESCRIPTION OF THE DRAWINGS

The accompanying drawings, which are incorporated in and constitutes a part of this specification, illustrate embodiments of the invention and, together with a general description of the invention given above, and the detailed description given below, serve to explain the invention.

DETAILED DESCRIPTION OF THE INVENTION

Figure 1:
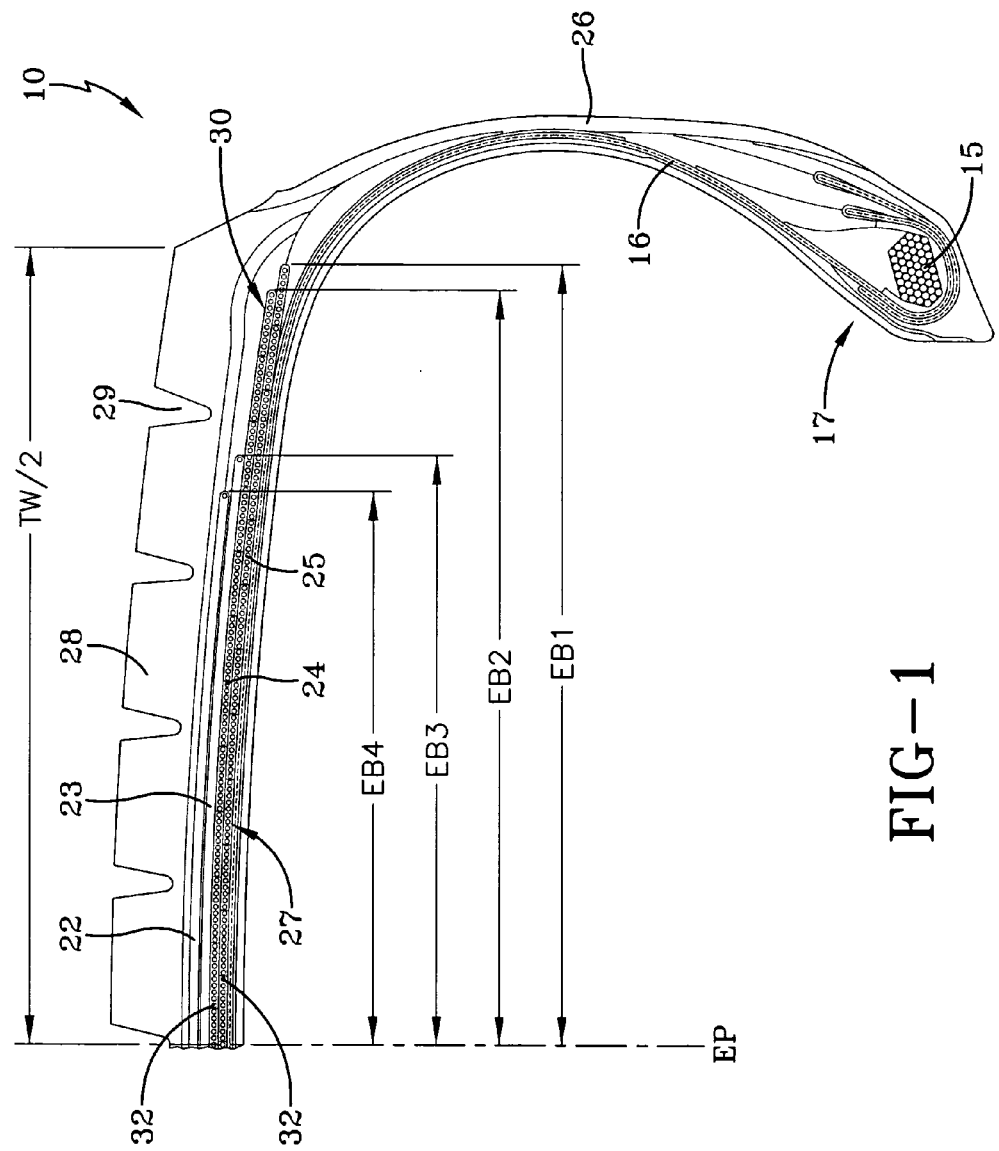
FIG. 1 is a cross-sectional view of half a tire according to a first embodiment of the invention taken in a plane that contains the axis of rotation of the tire.

With reference to FIG. 1, a preferred embodiment of the invention is illustrated. The pneumatic tire 10 comprises a pair of substantially parallel annular bead cores 15 located in beads 17 and a carcass ply 16. The carcass ply is wrapped over bead cores 15 such that reinforcement cords make an angle of between 75° and 90°, preferably about 90° with respect to the equatorial plane (EP) of the tire. Each bead comprises an apex, reinforcing plies such as chippers and flippers and gum strips as is well known in the tire art. A tread 28 comprising grooves 29 is disposed over a crown reinforcing or belt structure 27 and sidewalls 26 are arranged between the tread 28 and the beads 17. The carcass ply and belt plies, as is common in the art, are reinforced with substantially parallel longitudinal reinforcing members.

The crown reinforcing structure 27 comprises spliced belts plies 22 and 23 reinforced with steel cords. The radially outer belt ply 22 is reinforced with steel cords making an angle comprised between 45° and 75° (in abbreviation 45R and 75R) and preferably between 55° and 65° (55R and 65R) with respect to the equatorial plane (EP). The neighboring radially inner belt ply 23 is reinforced with steel cords making an angle comprised between −45° and −75° (in abbreviation 45L and 75L) and preferably between −55° and −65° (55L and 65L) with respect to the equatorial plane (EP). Generally the steel cords in these two radially outer belt plies have the same inclination but opposed angles with respect to the equatorial plane (EP) such as 60° for the belt ply 22 and −60° for belt ply 23. In the illustrated embodiment, the steel cords of the belt plies 22 and 23 have a construction of 12×0.35+1×0.15 though other steel cord constructions commonly used in the truck tire belt ply reinforcement field give good results. The steel grades are high tensile. The lateral density of the steel cords is comprised between 8 and 15 ends per inch (EPI) and preferably between 10 and 12 EPI.

Figure 5:
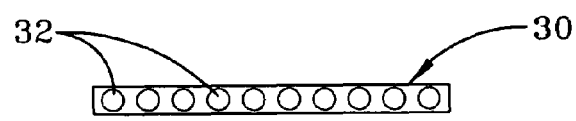
FIG. 5 illustrates an enlarged cross-sectional view of a steel cord reinforced ribbon.

Below belt plies 22 and 23 there is a spirally wound belt structure consisting of at least one spirally wound ribbon 30 and extending transversely at least as far as the edges of the spliced belt plies 22 and 23. The ribbon 30 as illustrated in FIG. 5, is made from elastomeric materials reinforced by cords 32 of steel. The spiral convolutions of the ribbon 30 make an angle of 0° to 5° with respect to the equatorial plane (EP) and are in abutment with any adjacent convolution, so as to form a continuous annular ring having a substantially even cord distribution across the axial width of the structure. The ribbon 30 has a thickness of about 2.5 mm and a width of 5 to 25 mm, and more preferably 8 to 16 mm, and a lateral cord distribution density of at least 8 EPI (ends per inch), preferably at least 10 EPI, and more preferably comprised between 12 and 16 EPI. The steel cords 32 reinforcing the ribbon 30 are made of high elongation steel. Such steel allows an elongation of at least 1.5% and preferably an elongation comprised between 1.6% and 4%. The steel grade giving good results is normal tensile. The steel cord construction as used in the different embodiments is 3×7×0.22.

The spirally wound structure has for smaller tire sizes, or for reinforcing steel cords of great strength, only one annular layer 25. The structure may include a second annular layer 24 located adjacent to and radially outward of the first annular layer 25. Preferably, the second layer 24 has its spiral convolutions on the opposite hand as compared to the winding of the first annular layer so that the cords 32 of each layer cross at a very small angle. With such a construction, the two layers 24, 25 could be wound continuously, in succession, without a break in the ribbon 30.

An alternative to the belt structure 27 (not represented) consists in having the spiral convolutions of the ribbon 30 not in abutment with adjacent convolutions. By varying the spacing between adjacent convolutions the restrictive effect of the annular layer 25 can be tailored to the requirements. By increasing the spacing between adjacent convolutions near the equatorial plane and reducing the spacing near the shoulder portions of the tire 10, the weight and wear balance of the tire may be improved.

Figure 2:
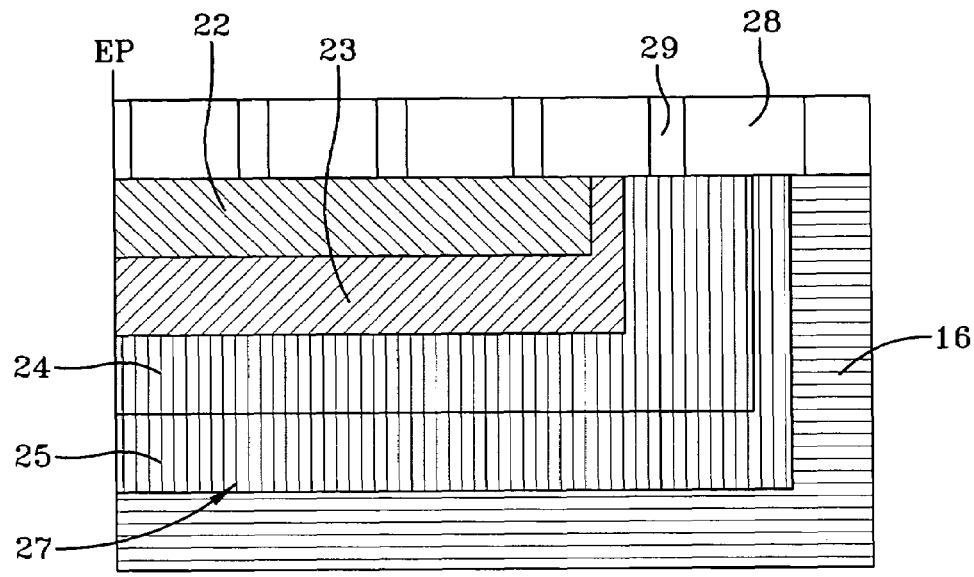
FIG. 2 illustrates a plan view of a portion of the crown reinforcing structure according to the embodiment shown in FIG. 1.
Figure 2A:
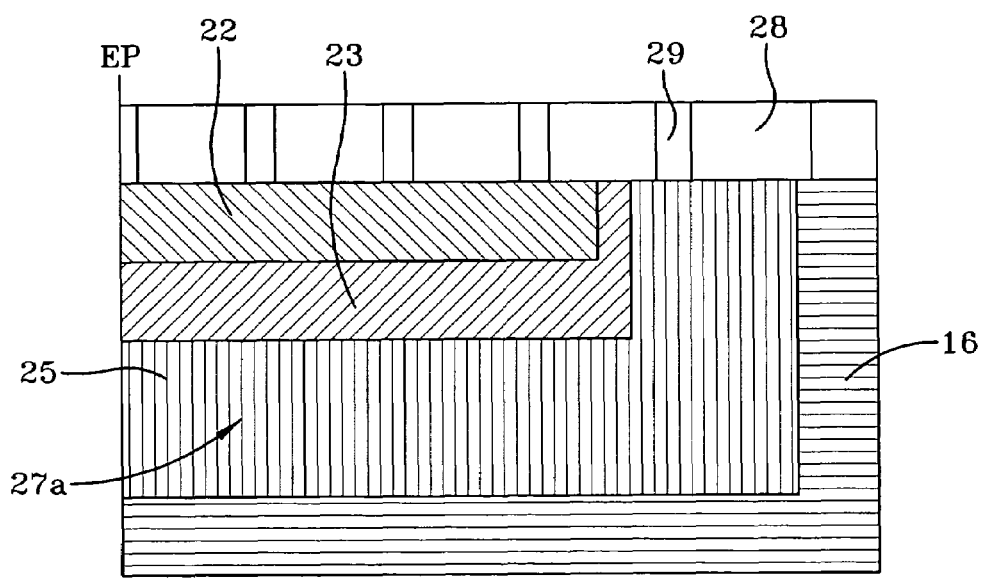
FIG. 2A illustrates a plan view of a portion of a crown reinforcing structure according to a further embodiment of the invention.

With reference to FIG. 2A in which like reference numerals refer to like features in FIGS. 1 and 2 and in accordance with an alternative embodiment of the invention, a belt structure 27a includes the single annular layer 25 consisting of one spirally wound ribbon 30 (FIG. 5) and extending transversely at least as far as the edges of the spliced belt plies 22 and 23. The use of a single annular layer 25 saves weight, cost, and processing time during manufacture. Preferably, the steel cord construction for the steel cords 32 is 4×7×0.26 High Tensile carbon steel, although the invention is not so limited.

The steel cords 32 may be formed from Normal Tensile, High Tensile, or Super Tensile carbon steel. The use of Super Tensile carbon steel for the cord constructions permits reductions in, for example, the number and the size of the filaments while maintaining or even strengthening the tire 10. Exemplary Super Tensile steels are disclosed in U.S. Pat. Nos. 4,960,473 and 5,066,455, each of which is hereby incorporated by reference herein in its entirety. The individual diameter of each filament in one of the steel cords 32 typically ranges from 0.15 mm to 0.30 mm, preferably 0.26 mm.

Any HE construction providing an elongation of at least 1.5% may be utilized for the steel cords 32. Representative high elongation (HE) constructions for steel cords include 2+2, 2+5, 2+6, 2+7, 2+8, 2+9, 2+10, 3+2, 3+3, 3+4, 3+6, 3+9, 3/9, 4+3, 4×4, 4×7, 7×2, 7×3, 7×4, and 7×7, and may also include an optional spiral wrap (e.g., 4×7+1). Such HE cord constructions are understandable to those ordinarily skilled in the art. For example, a cord construction of 4×7 means a cord formed from four strands of seven filaments. As other examples, cord constructions such as 2+2 and 2+5 indicate two core filaments wrapped by two or five filaments, respectively. The total number of filaments in the steel cords 32 (FIG. 5) in ribbon 30 typically ranges from 4 to 50. Preferably, each steel cord 32 includes 28 individual filaments arranged in a 4×7 HE construction.

The lay length of the steel cords 32, which represents the axial distance required to make a 360° revolution of any filament in the cord 32, is typically less than 15 mm and may be adjusted to provide optimum elongation properties. The steel cords 32 are arranged so as to typically have a lateral density of less than 20 ends per inch, and preferably less than or equal to 14 ends per inch, when measured at the equatorial plane (EP) of the tire 10. Generally, the number of ends per inch increases with decreasing cord diameter for a given treatment strength.

Figure 6:
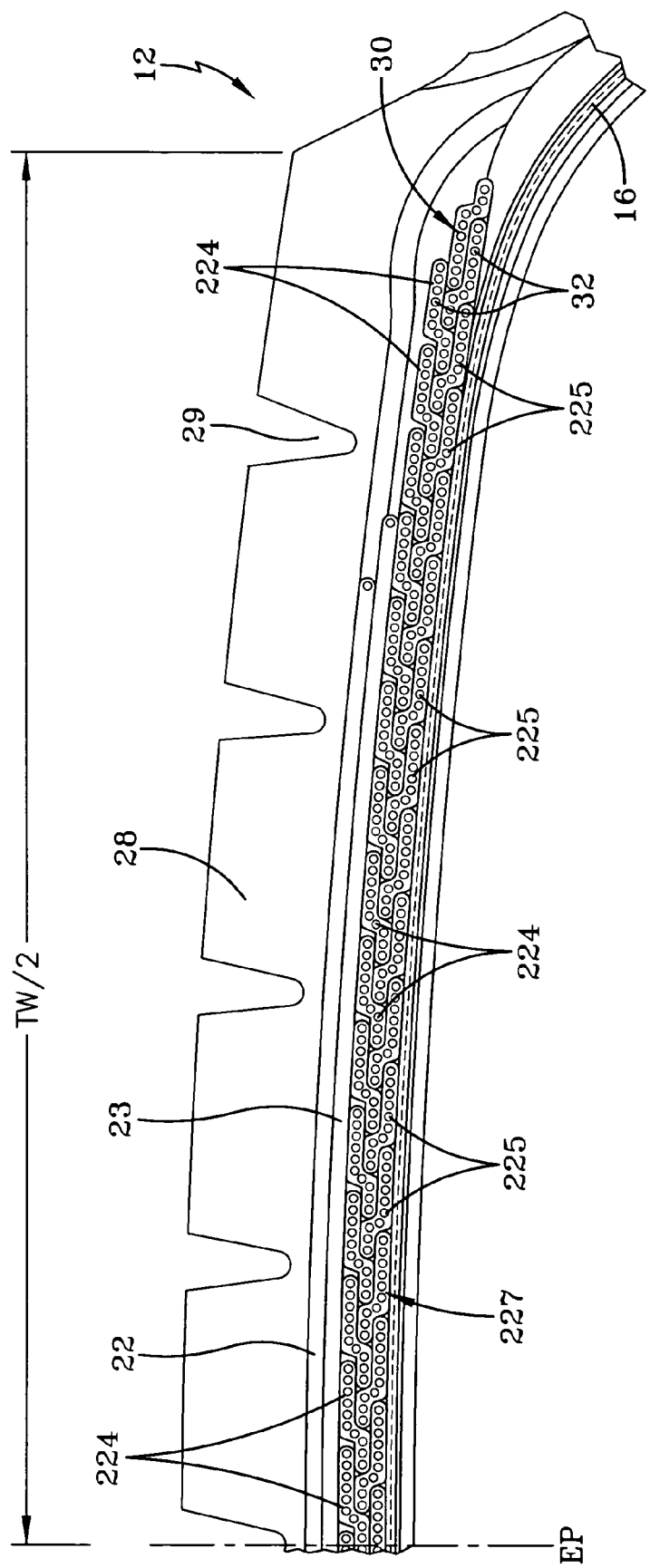
FIG. 6 is a cross-sectional view of half a crown portion of a tire according to a further embodiment of the invention taken in a plane that contains the axis of rotation of the tire.

A further embodiment of a belt structure 227 according to the invention is illustrated in FIG. 6, representing a tire 12 wherein the ribbon(s) in the annular layers 224 and 225 have a constant overlapping relationship with one another. The two spliced belts 22 and 23 have reinforcement cords with inclinations with respect to the equatorial plane which are comparable to those in FIG. 1 or 3.

The ribbon 30 can be applied in one single operation or two ribbons having the same or different width can be applied successively. By varying the amount of overlap between adjacent convolutions, different cord densities are possible throughout the axial extent of the reinforcement zone. In any case, it is preferred that the variable concentrations of the reinforcement material are symmetrical with respect to the equatorial plane EP of the tire.

The crown reinforcing structure 27 as shown in FIG. 1 is staggered, meaning that each radially outer belt 22 has a smaller lateral extension than the adjacent radially inner belt 23. The width (EB1) of half the laterally inner helically wound belt 25 may be comprised between 70 and 110% of half the treadwidth (TW/2) and is preferably about 98% of TW/2. The width (EB2) of half the adjacent neighboring helically wound belt 24 may be also comprised between 70 and 110% of half the treadwidth (TW/2) and is preferably about 92% of TW/2. The width (EB3) of half the radially inner belt 23 may be comprised between 70 and 100% of half the treadwidth (TW/2) and is preferably about 74% of TW/2. The width (EB4) of half the radially outer belt 22 may also be comprised between 60 and 100% of half the treadwidth (TW/2) and is preferably about 70% of TW/2.

FIG. 2 shows a plan view of the crown reinforcement represented in FIG. 1 where part of the tread 29 has been removed.

Figure 3:
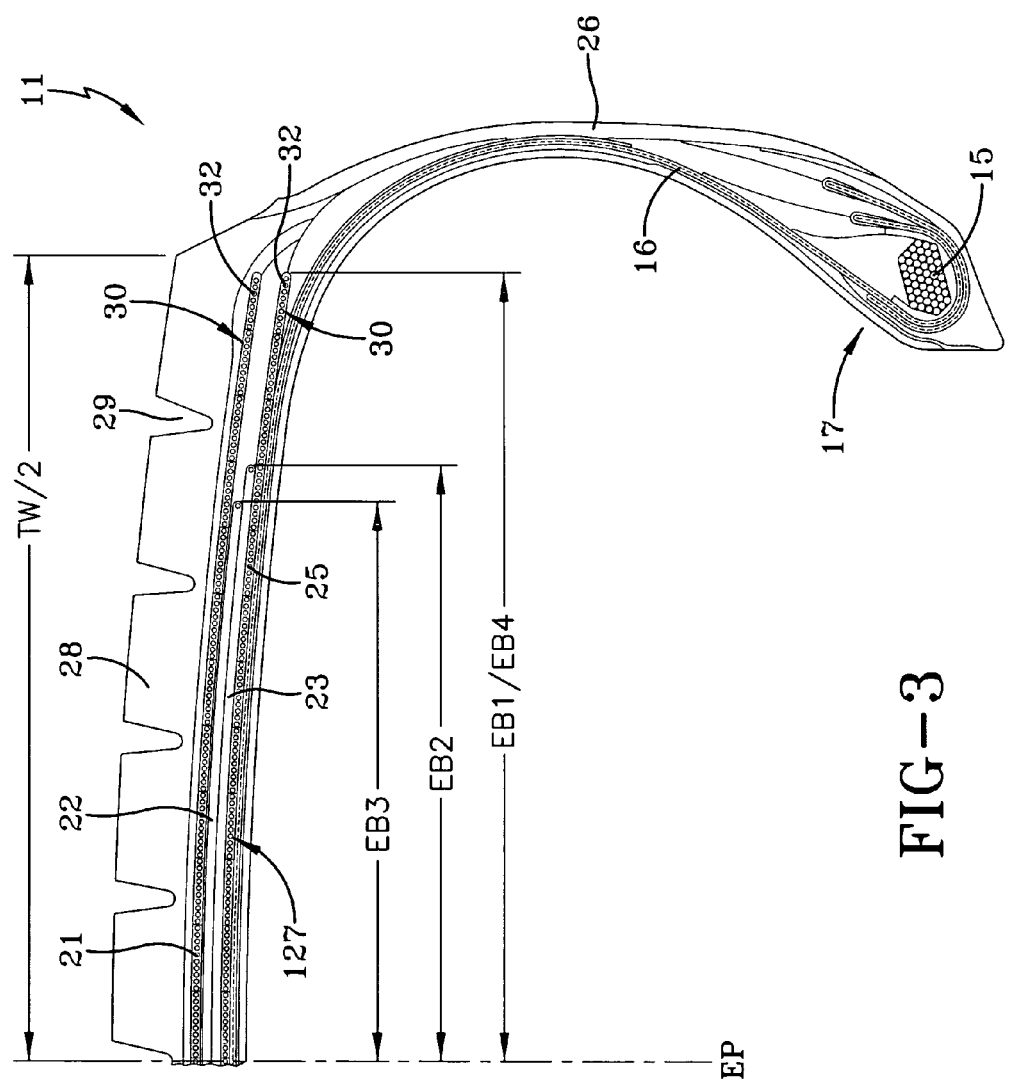
FIG. 3 is a cross-sectional view of half a tire according to a further embodiment of the invention taken in a plane that contains the axis of rotation of the tire.
Figure 4:
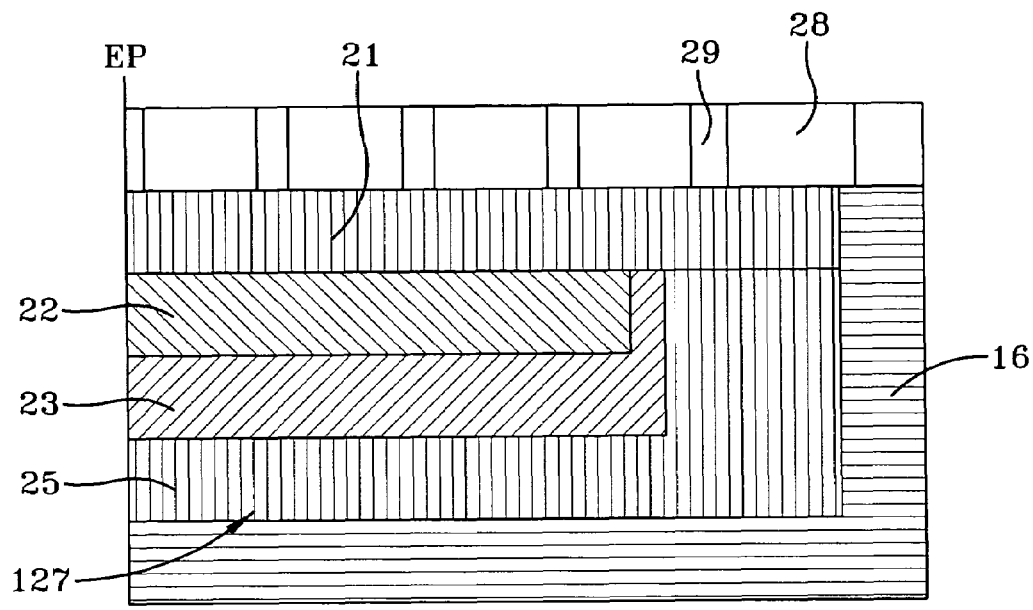
FIG. 4 illustrates a plan view of a portion of the crown reinforcing structure according to the embodiment shown in FIG. 3.

With reference now to FIG. 3, a further embodiment of the invention is illustrated.

Elements throughout the drawing which are similar or identical with elements represented in FIG. 1 are referred to by identical reference numerals.

The crown reinforcing structure 127 of super single tire 11 comprises spliced belt plies 22 and 23 reinforced with steel cords. The radially outer spliced belt ply 22 is reinforced with steel cords making an angle comprised between 45° and 75° and preferably between 55° and 65° with respect to the equatorial plane (EP). The neighboring radially inner spliced ply 23 is reinforced with steel cords making an angle comprised between −45° and −75° and preferably between −55° and −75° with respect to the equatorial plane (EP). The steel cords in the two spliced belt plies 22 and 23 have preferably the same inclination but opposed angles with respect to the equatorial plane (EP) such as 60° for the belt ply 22 and −60° for belt ply 23.

Below the radially inner belt ply 23 there is a spirally wound belt 25 consisting of a spirally wound ribbon 30 and extending transversely at least as far as the edges of the spliced belt plies 22 and 23. The ribbon 30 is made from elastomeric materials reinforced by cords 32 of steel. The spiral convolutions of the ribbon 30 make an angle 0° to 5° with respect to the equatorial plane (EP) and are in abutment with any adjacent convolution, so as to form a continuous annular ring having a substantially even cord distribution across the axial width of the structure.

A second annular layer 21 is spirally wound on the radially outward spliced belt ply 22 and extends transversely at least as far as the edges of the spliced belt plies 22 and 23 and preferably about the same distance as the radially inner belt ply 25.

It is believed possible to further improve the characteristics of such a belt package by modifying and more specifically increasing the Shore A hardness of the tread compound above 70 though such increase might result in a tradeoff of other tread properties, like chip-chunk problems and durability.

Tire set 1, of size 495/45R22.5 was made according to the embodiment of the invention represented in FIG. 1 and had more specifically the belt construction 0-0-60R-60L.

Tire set 2, of size 495/45R22.5 was made according to the embodiment represented in FIG. 1 and had more specifically the belt construction 0-0-75R-75L.

Tire set 3 of size 495/45R22.5 was made according to the embodiment represented in FIG. 3 and had more specifically the belt construction 0-60R-60L-0.

Tire set 4 of size 495/45R22.5 was made according to standard truck tire design and had more specifically the belt construction 67R-21R-21L-21R+BER, where BER stands for a spirally wound ribbon on the lateral radially outer belt edges.

The belt ply reinforcing steel grades, cord constructions and EPI in the different sets were chosen identical.

At the time of drafting of application Ser. No. 10/132,635, the tires showed the results as indicated in table 1.

TABLE 1

TEST RESULTS

|  | Tire 1 | Tire 2 | Tire 3 | Control | Objectives |
|---|---|---|---|---|---|
| Belt 1 | 0 Deg/wide | 0 Deg/wide | 0 Deg/wide | 67R | |
| Belt 2 | 0 Deg/wide | 0 Deg/wide | 60R/narrow | 21R | |
| Belt 3 | 60R/narrow | 75R/narrow | 60L/narrow | 21L | |
| Belt 4 | 60L/narrow | 75L/narrow | 0 Deg/wide | 21R | |
| SWL1 | 6617 | 9609 | 11205 | 2141 | 5400 |
| END 2 | (78h21) | 95h53 | 100h(*) | 52h00 | 62h00 |
| Light handling test | 6.4 | 6.2 | 6.5 | 6.1 | 6 (DUAL) |

1 SWL represents the smooth wheel mileage.
2 END represents the legal endurance test ECE 54.
(*)means that the test was stopped as the tire fulfills the requirements.
(DUAL)means the result of dual mounted tires.

Figure 7:
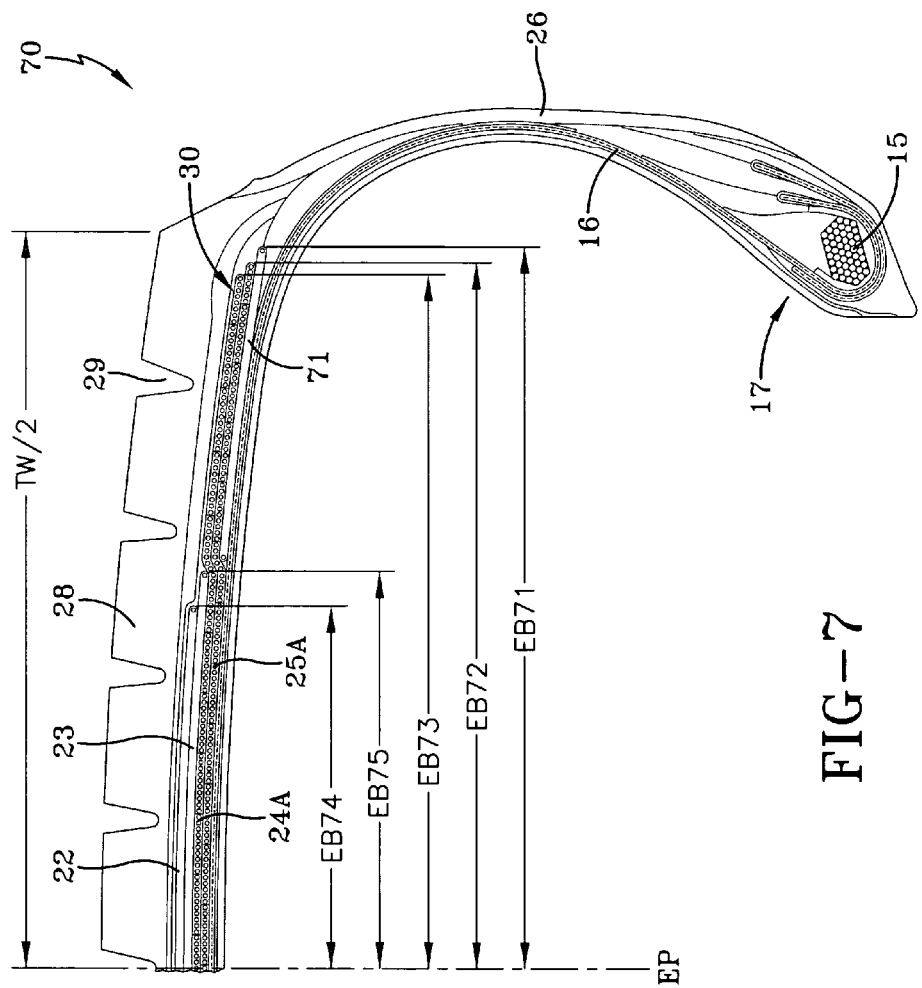
FIG. 7 is a cross-sectional view of half a tire according to a still further embodiment of the invention taken in a plane that contains the axis of rotation of the tire.

A still further embodiment of a belt structure according to the invention is shown in FIG. 7. The tire 70 includes a staggered steel belt package made up of four belts, see references 25A, 24A, 23, 22, on top of two steel cord strips 71. The two strips 71 are adjacent to the shoulders of the tire and equally spaced from the equatorial plane of the tire. The strips are located between the carcass ply 16 and the radially inner helically wound belt ply 25A. The cords reinforcing the shoulder strips form angles comprised between 40 and 80 degrees with respect to the equatorial plane of the tire and preferably between 50 and 70 degrees. The inclination may be to the right R or to the left L, R being preferred. Presently preferred is an inclination of 60 degrees and a steel cord construction of 3×0.365+9×0.34. The lateral spacing of the cords is about 10 EPI. The strip has a width comprised between 10% and 45% of half the tread width TW/2, preferably between 20% and 30% of TW/2. The lateral outer end of the shoulder strip is spaced a distance from the equatorial plane EP of EB71 which is between 70% and 105%, preferably between 80% and 95% of half the tread width TW/2.

The first spirally wound belt ply 25A has an inclination of its reinforcing cords comprised between 0 and 5 degrees with respect to the equatorial plane. The reinforcement comprises high elongation steel cords, having for example a construction 3×7×0.22 and a lateral spacing comprised between 11 and 14 EPI. The belt width 2×EB72 is comprised between 70% and 105% of the tread width TW.

The second spirally wound belt ply 24A has the same steel cord inclination, is reinforced by the same cords, and has the same lateral spacing of the steel cords as the first belt ply 25A. The belt width (2×EB73) is comparable to the width of the first belt, slightly smaller being preferred.

The third spliced belt ply 23 is reinforced by steel cords having for instance the construction 3×0.365+9×0.34, which cords have an inclination comprised between 40 and 70 degrees (40L to 70L) with respect to the equatorial plane, an inclination of 50 to 60 degrees being preferred. The lateral spacing of the cords is about 10 EPI. The belt width (2×EB75) is comprised between 40% and 70% of the treadwidth TW, preferably about 50%. There should be no overlap of the axially inner portions of the strips 71 and the axially outer portions of the spiced belt plies 22 and 23.

The fourth spliced belt ply 22 is reinforced as the third belt with the difference that the angles are opposed with respect to the equatorial plane (40R to 70R) as discussed more specifically above in connection with FIG. 1. The belt width (2×EB74) is comparable to but slightly smaller than belt ply 23.

As well known in the truck tire art it is of course possible to provide the crown reinforcement with a radially outer belt ply reinforced with nylon cords, such as nylon monofilament cords. The outer belt ply has as prime objective to protect the steel cords from humidity and to protect the crown reinforcing structure during the different steps of a retreading operation, such as tread buffing.

While the invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A pneumatic tire comprising:
   at least one pair of parallel annular beads;
   at least one carcass ply wrapped around said beads;
   a tread;
   first and second sidewalls disposed between said tread and one of said at least one pair of beads; and
   a crown reinforcing structure disposed between said at least one carcass ply and said tread in a crown area of said tire, said crown reinforcing structure including a plurality of spliced belt plies reinforced with steel cords and a single helically wound belt ply reinforced with high elongation steel cords each having a 4×7 cord construction with an elongation at break of 1.50% to less than 4% and a lay length of less than 15 mm, said single helically wound belt ply being located between said at least one carcass ply and said spliced belt plies.

2. The pneumatic tire of claim 1 wherein said high elongation steel cords have a lateral density of less than 20 ends per inch when measured at an equatorial plane of the tire.

3. The pneumatic tire of claim 2 wherein said high elongation steel cords have a lateral density of less than or equal to 14 ends per inch.

4. The pneumatic tire defined in claim 1 wherein said high elongation steel cords have a filament diameter ranging from 0.15 mm to 0.30 mm.

5. The pneumatic tire defined in claim 4 wherein said filament diameter is 0.26 mm.

6. The pneumatic tire of claim 1 wherein each of said high elongation steel cords is formed from a carbon steel selected from the group consisting of Normal Tensile carbon steel, High Tensile carbon steel, and Super Tensile carbon steel.

7. The pneumatic tire of claim 6 wherein said carbon steel is High Tensile carbon steel.

8. The pneumatic tire of claim 1 wherein said tire has an axis of rotation and said single helically wound belt ply is defined by a ribbon that makes spiral convolutions about said axis of rotation.

9. The pneumatic tire of claim 8 wherein said tire includes an equatorial plane perpendicular to said axis of rotation and said spiral convolutions of said ribbon make an angle of 0° to 5° with respect to said equatorial plane.

10. The pneumatic tire of claim 8 wherein said ribbon has a width of 5 mm to 25 mm.

11. The pneumatic tire of claim 10 wherein said ribbon has a width of 8 mm to 16 mm.

12. The pneumatic tire of claim 8 wherein said ribbon has a thickness of about 2.5 mm.

13. The pneumatic tire of claim 8 wherein each of said spiral convolutions abuts any adjacent spiral convolutions so as to form a continuous annular ring.

14. A pneumatic fire comprising:
at least one pair of parallel annular beads;
at least one carcass ply wrapped around said beads;
a tread;
first and second sidewalls disposed between said tread and one of said at least one pair of beads; and
a crown reinforcing structure disposed between said at least one carcass ply and said tread in a crown area of said tire, said crown reinforcing structure including a plurality of spliced belt plies reinforced with steel cords and a single helically wound belt ply reinforced with high elongation steel cords each having a 4×7 cord construction with an elongation at break of 1.5% to less than 4% and a lay length of less than 15 mm, said single helically wound belt ply being located between said at least one carcass ply and said spliced belt plies and being defined by a ribbon that makes spiral convolutions about an axis of rotation of the tire, said high elongation steel cords having a lateral density of less than 20 ends per inch when measured at an equatorial plane of the fire and a filament diameter ranging from 0.15 mm to 0.30 mm, said ribbon having a width of 5 mm to 25 mm.

15. The pneumatic tire defined in claim 14 wherein said filament diameter is 0.26 mm.

* * * * *

UNITED STATES PATENT AND TRADEMARK OFFICE
CERTIFICATE OF CORRECTION

PATENT NO. : 7,404,425 B2
APPLICATION NO. : 11/050061
DATED : July 29, 2008
INVENTOR(S) : Anthony Hardy et al.

It is certified that error appears in the above-identified patent and that said Letters Patent is hereby corrected as shown below:

Column 9, Claim 14, line 18, change "fire" to --tire--.

Column 10, Claim 14, line 16, change "fire" to --tire--.

Signed and Sealed this

Third Day of February, 2009

JOHN DOLL
*Acting Director of the United States Patent and Trademark Office*